United States Patent

Jones

[11] 3,842,754
[45] Oct. 22, 1974

[54] VEHICLE HOLDDOWN
[75] Inventor: Roland P. Jones, Westland, Mich.
[73] Assignee: Cast Metal Industries, Inc., Farmington, Mich.
[22] Filed: Sept. 13, 1973
[21] Appl. No.: 397,138

[52] U.S. Cl................105/368 T, 242/54 R, 254/51
[51] Int. Cl............................................. B60p 7/08
[58] Field of Search............... 105/368 T, 369 A; 248/361 A, 119 R; 242/54 R, 100; 254/51, 254/161, 164; 280/179 A

[56] References Cited
UNITED STATES PATENTS

| | | | |
|---|---|---|---|
| 3,564,577 | 2/1971 | Blunden et al. | 105/368 T X |
| 3,673,969 | 7/1972 | Peisner et al. | 105/368 T X |
| 3,715,994 | 2/1973 | Mietla | 105/368 T |

Primary Examiner—M. Henson Wood, Jr.
Assistant Examiner—Gene A. Church
Attorney, Agent, or Firm—Cullen, Settle, Sloman & Cantor

[57] ABSTRACT
A vehicle holddown for engaging with a channel fixed upon a supporting deck of a transport, such as a railroad car, for anchoring a vehicle, such as an automobile, thereto. The holddown is formed of a box-like body having an open end. A vertically axised shaft extends through the body, with its lower end journalled to the body bottom wall and its upper end having an enlarged ring journalled within a cooperating opening formed in the body upper wall. The upper end of the shaft, above the ring, is formed as a toothed ratchet wheel of smaller O.D. than the ring. A manually removable pawl, pivotally mounted upon the body upper wall, which both engages the ratchet wheel and also overlaps the ring portion bordering the wheel to simultaneously lock the wheel and shaft against rotation in one direction and against upward movement from the body. A holddown chain has an end extending through the body open end and connected to the shaft, for winding upon the shaft, and an opposite hooked end for engaging a vehicle. The body open end and the ring journalling opening are of sufficient size to permit passage of the chain, including its hooked end, therethrough for upwards withdrawal of the shaft and chain from the body member, upon manual removal of the pawl, without moving the holddown relative to the channel.

7 Claims, 10 Drawing Figures

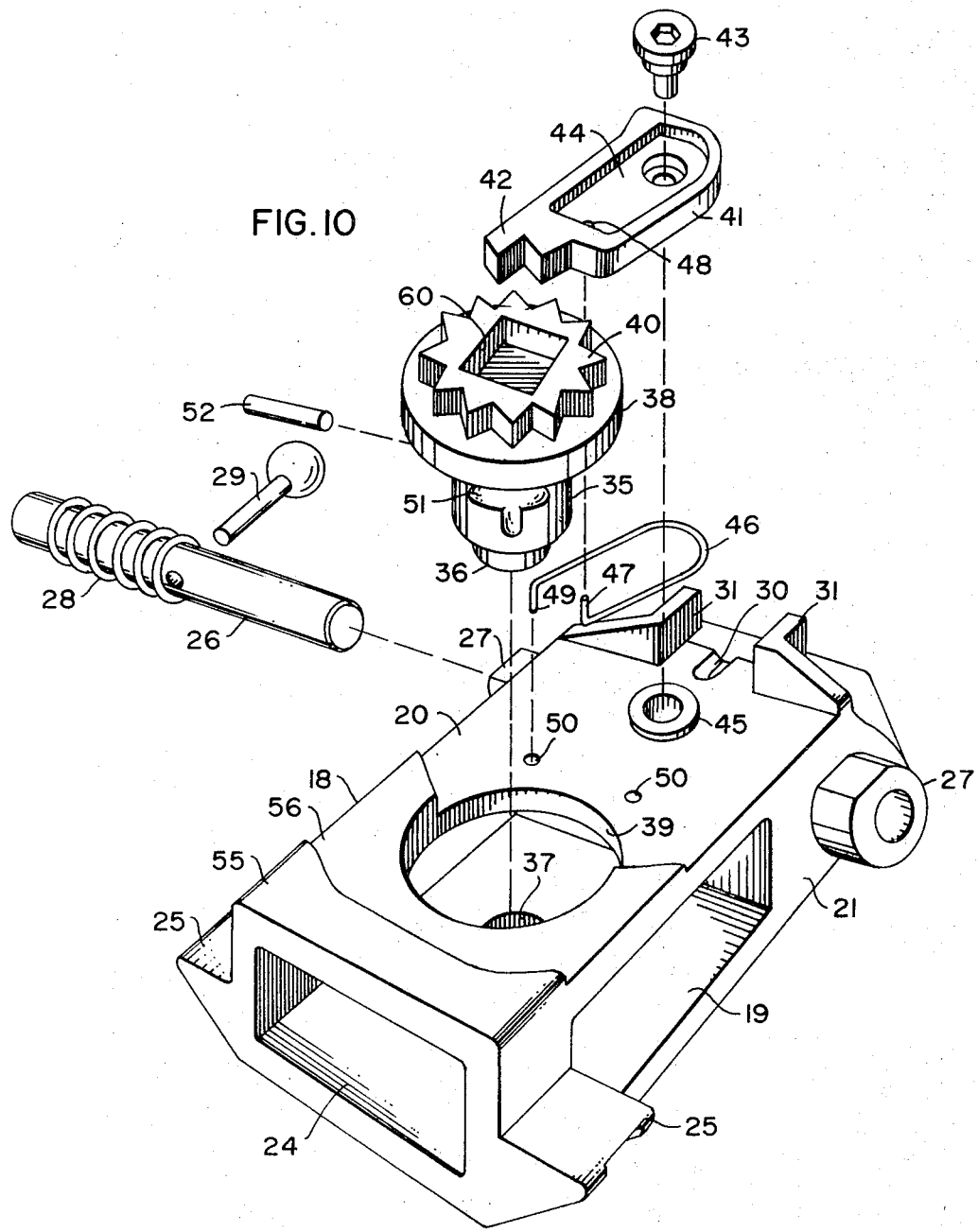

VEHICLE HOLDDOWN

BACKGROUND OF INVENTION

The invention herein relates to vehicle holddowns which are used in transporting vehicles, such as automobiles, upon transports such as railroad cars or trucks. Conventionally, elongated channels are secured to the deck of the transport, as a railroad car deck, upon which automotive vehicles are supported for transportation. The vehicles are fastened to the transport deck by means of chains having hooks on one end for engagement with the underside of the vehicle, and opposite ends wound around a capstan or shaft forming part of a holddown which in turn is engaged within the channels or rails fastened upon the transport deck. Examples of this type of construction are illustrated in the patents to Haynes U.S. Pat. No. 3,589,304, issued June 29, 1971, and Blunden U.S. Pat. No. 3,564,577 issued Feb. 16, 1971, and Peisner, et al., U.S. Pat. No. 3,673,969 issued July 4, 1972.

In these prior art devices, such as those illustrated in the above mentioned patents, it is necessary to remove the holddown from the channel in order to remove and replace a holddown chain. In addition, it is necessary to provide some way to keep the capstan or shaft within the housing or body of the holddown to prevent its inadvertent upwards removal and simultaneously, to permit removal when desired.

Further, in the transportation of modern automobiles on railroad cars, the vehicle road clearances are so small, that it is important to reduce the overall height or profile of the holddown and channel to the maximum extent possible to avoid interference when loading. Thus, the invention herein relates to an improved holddown which provides the foregoing advantages.

SUMMARY OF INVENTION

The invention herein relates to an automobile vehicle holddown for connecting the end of the holddown chain to the transport deck channels, which holddown is provided with a body or housing having an upper and lower wall and formed in a box-like shape, with a vertically axised shaft extending through the walls for rotation. The upper end of the shaft is provided with a ring which is journalled within an enlarged opening in the upper wall and a ratchet wheel is formed upon the shaft above the ring with the ratchet wheel being smaller in a diameter than the ring to form a border around it. A pawl removably pivotally connected upon the body upper wall overlaps the ring and engages the teeth of the ratchet. Thus, the pawl holds the shaft down against inadvertent upward movement, as well as locks the ratchet teeth for one-way rotation. Upon manual removal of the ratchet, the shaft can be removed upwardly from the body or housing. Due to the enlarged ring receiving hole and enlarged forward end opening in the body, the entire chain, including its hooks, can be pulled through the housing and upwardly along with the shaft for removal of the chain and replacement thereof without the necessity of moving the body from a prefixed location in the channel.

The body is formed of a one-piece casting having an upwardly extending integral ridge or shield of thickened portion formed upon the forward end of the upper wall. The ridge is of a height to screen and protect the ratchet wheel and ratchet, as well as to provide additional strength to the cast body.

This construction provides a simplified system for securing the windup shaft or capstan within the body, against upward movement as well as for one-way rotation, and moreover, reduces the overall height required to thus provide a lower than conventional profile for the holddown.

These and other objects and advantages of this invention will become apparent upon reading the following description, of which the attached drawings form a part.

DESCRIPTION OF DRAWINGS

FIG. 10 is a disassembled view of the parts of the holddown, shown in perspective.

DETAILED DESCRIPTION

Figure 1:
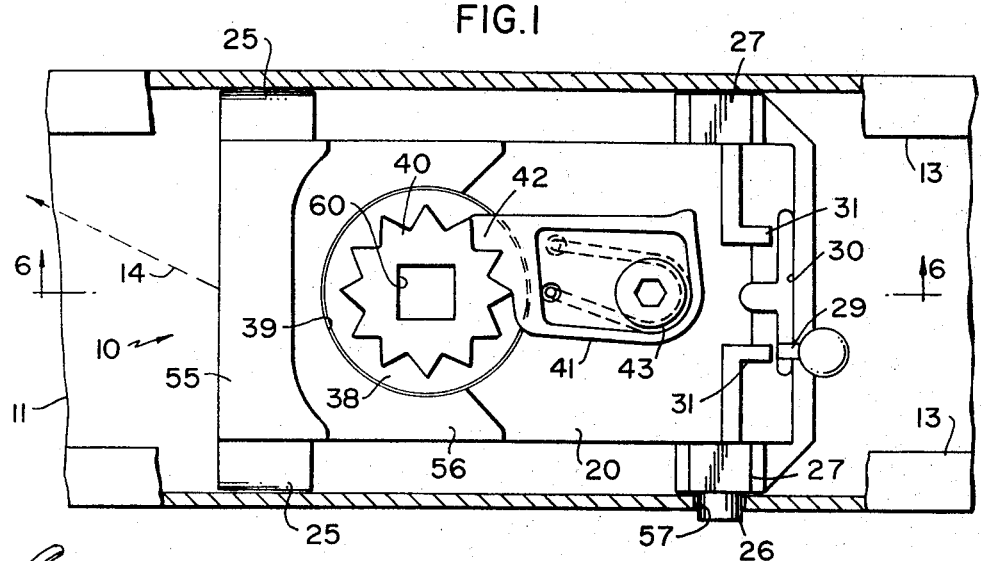
FIG. 1 is a top plan view of the holddown shown mounted within a section of rail or channel.
Figure 2:
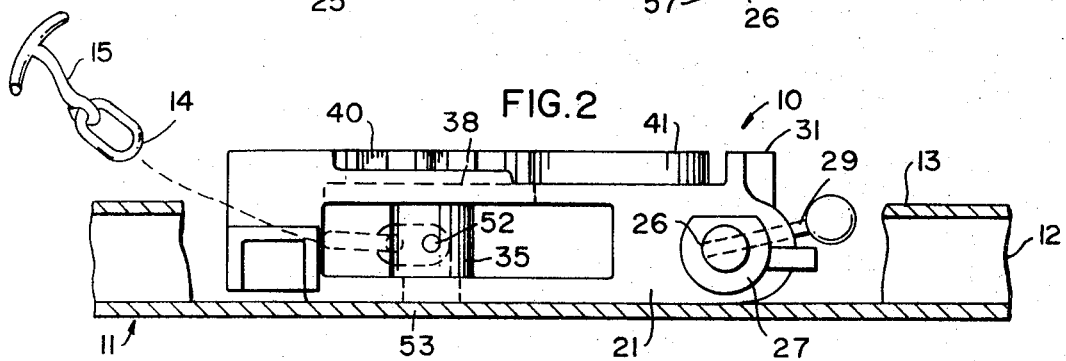
FIG. 2 is an elevational view of the holddown mounted within the rail whose portions are broken away for illustration purposes.
Figure 3:
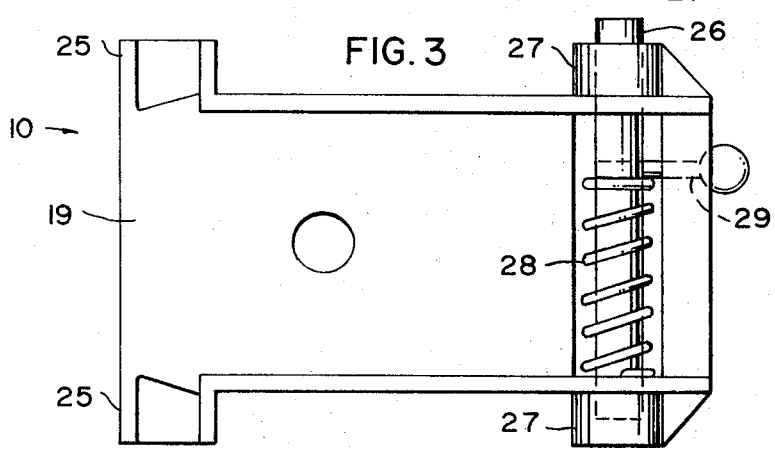
FIG. 3 is a bottom plan view of the holddown, per se.
Figures 4, 5:
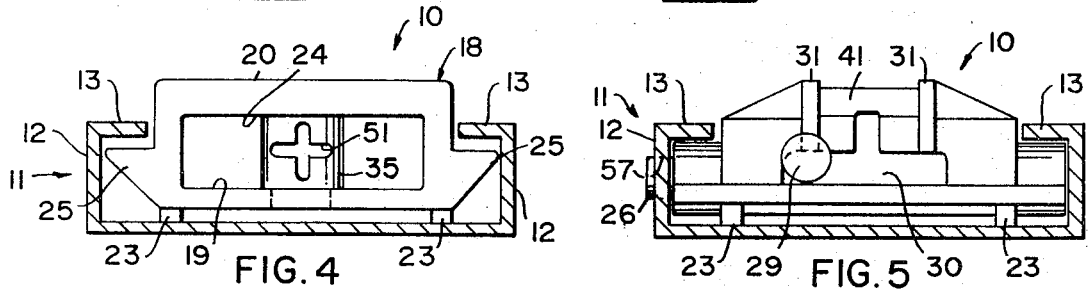
FIG. 4 is a front end view of the holddown.
FIG. 5 is a rear end view of the holddown.

In FIGS. 1 and 2, the holddown 10 is shown positioned within a channel-shaped rail 11 having side flanges 12 and upper inturned flanges 13, as is conventional. The rail is permanently fastened upon the deck of a transport, such as a railroad car deck, not illustrated.

The holddown is used to secure a chain 14 or similar flexible connecting element to the transport deck. Conventionally, such type chains include a hook 15 which may be specially shaped to engage with some receptacle or receiving hole formed on the lower end of a vehicle, such as a suitably shaped slot formed in the automotive vehicle frame.

Figure 6:
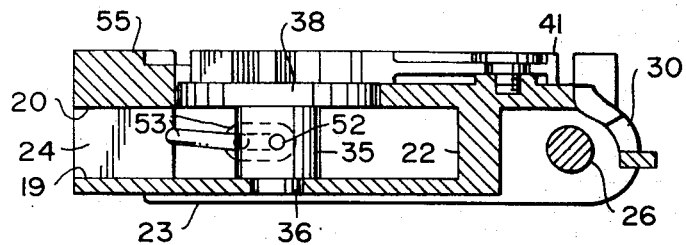
FIG. 6 is a cross-sectional view of the holddown, per se, taken in the direction of arrows 6—6 of FIG. 1.
Figure 7:
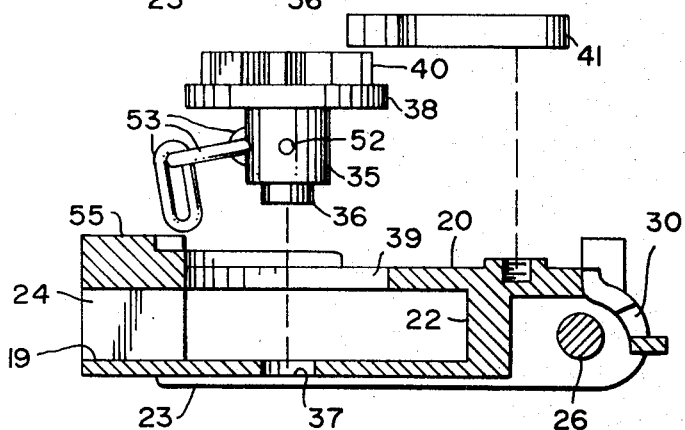
FIG. 7 is a view similar to FIG. 6, but showing the removal of the windup shaft.

The holddown comprises a box-like shaped hollow body having a floor or bottom wall 19 and a top wall 20, with open sidewalls 21 and an inner rear wall 22 (see FIGS. 6–7). Skids 23 are formed along the lower surface of the bottom wall for sliding the body along the direction of the channel and positioning it as required. The body is preferably made as a one-piece casting.

The forward end 24 of the body is open so that the chain may be inserted therethrough. The body also includes outwardly extending forward ears 25 for engaging beneath the inturned ends 13 of the side flanges 12 of the channels.

At the rear end of the body, a shaft 26 is journalled through opposing bosses 27. A coil spring 28 surrounds a portion of the shaft and is retained against a handle 29 extending through a suitable opening formed in the shaft for thereby spring biasing the shaft in one direction.

At the rear of the body or housing, an inverted T-shaped slot 30 is formed for receiving the handle 29 so that the handle may be positioned in one of several positions for thereby holding the shaft 26 either extended or retracted through either of the two bosses, depending upon the location of the spring. To protect the handle, particularly in its upward position, rear protective flanges 31 are formed at the rear of the body.

The inner end of the chain 14 is adapted to be wound around a vertical windup shaft or capstan 35 which is provided with a reduced lower end portion 36 journalled in a suitably sized opening 37 formed in the bottom wall 19 of the body. The upper end of the shaft is provided with an enlarged ring-portion 38 which is journalled in a suitably sized opening 39 formed in the upper wall of the body.

Above the ring, a toothed ratchet wheel 40 is formed upon the shaft. Preferably, the shaft, ring and ratchet wheel are all formed integral out of one piece of metal.

A pawl 41 located upon the upper surface of the top wall of the body, is arranged so that its forwardly extending teeth 42 engage one or more of the teeth of the ratchet wheel for one-way rotation thereof. The pawl is pivotally connected to the upper wall by means of a suitable pivot screw 43 located upon a depressed center web portion 44 of the ratchet and engaging in a threaded opening surrounded by a boss 45 (see FIG. 10) formed on the body upper wall 20.

Figure 8:
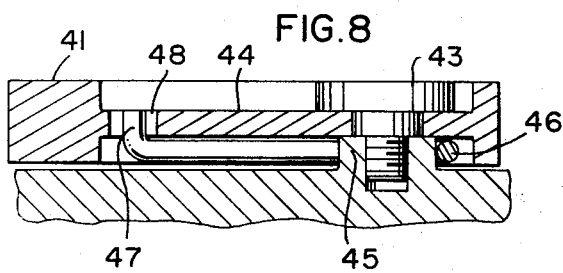
FIG. 8 is an enlarged fragmentary, cross-sectional view showing the mounting of the ratchet upon the body.
Figure 9:
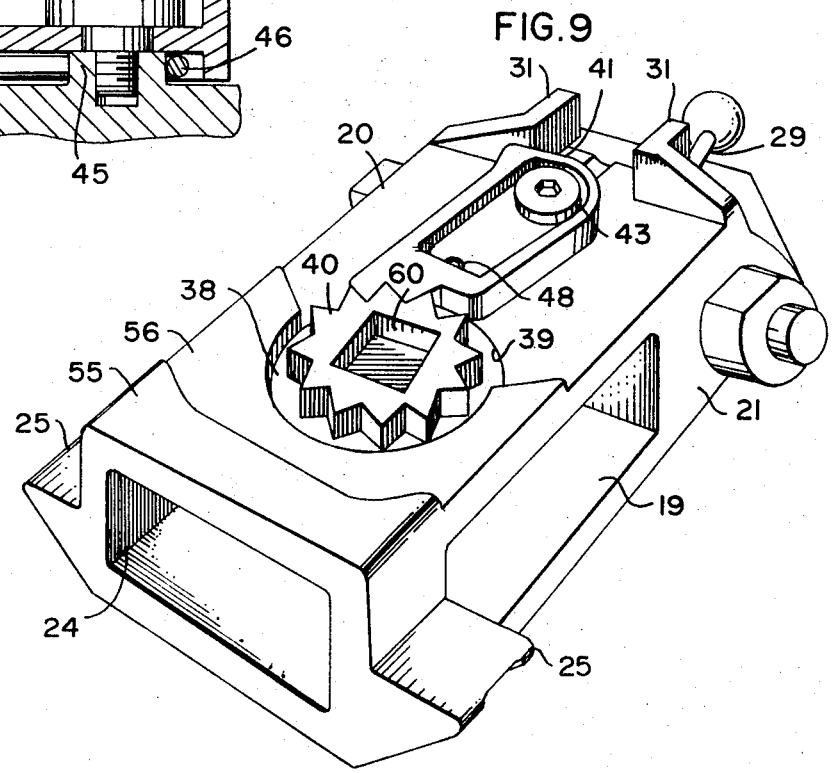
FIG. 9 is a perspective view of the holddown.

A hairpin shaped spring 46 surrounds the boss 45 (see FIGS. 8 and 10) and is provided with a bent spring end 47 engaged within a hole 48 in the pawl web and an oppositely bent spring end portion 49 engaged within one or another of two holes 50 formed in the top wall 20 of the body. Thus, the spring urges the ratchet in one direction or the other, depending upon which of the two holes 50 it is engaged within. The ratchet may be positioned as shown in FIG. 9, or may be turned up side down, that is, inverted, to reversely operate against the ratchet teeth.

The vertical shaft 35 is provided with a cross-shaped slot 51 to receive the links 53 which are at the end and next to the end of the chain 14. A pin 52 extending transversely through the shaft engages the endmost link and holds it within the slot.

The top wall of the body may be formed with an integral shield or ridge-like enlargement 55, with a rearward thickened enlargement 56 of lower height to surround the ratchet and protect against objects striking the ratchet and the pawl.

In operation, the holddown is slid endwise through the channel which is fastened upon the transport deck, until the holddown is properly located for engaging with a vehicle. At this point, the shaft 26 is engaged with one of a number of holes 57 formed in the flanges 12 of the channel.

Thereafter, the hook 15 of the chain is engaged with the corresponding portion of the vehicle and the chain is then tightly wound around the vertical shaft to pull the vehicle down against the transport deck. To assist in winding the shaft, a socket hole 60 may be formed in its upper end to receive a suitable wrench. Once the chain end is tightly pulled down, that is wound around the shaft, the pawl engaging the ratchet prevents reverse rotation and loosening of the wound up chain. Simultaneously, the pawl holds the shaft downwardly by engaging the upper surface of the ring portion bordering the ratchet. To release the chain, the pawl is simply hand moved out of engagement with the ratchet, thereby permitting the chain to unwind from the shaft.

Depending upon whether it is desired to have the chain wound clockwise or counterclockwise around the shaft, the pawl may be positioned as shown in FIG. 9 or reversely positioned. However, at all times, it engages the upper surface of the ring to prevent removal of the shaft.

Where it is necessary to remove the chain, as for example where a link breaks or where the chain is worn or where a longer or shorter chain may be necessary, the screw 43 may be manually removed to thereby permit removal of the pawl and upward movement of the shaft due to the release of the pawl from against the ring. By lifting the ratchet-ring-shaft unit upwardly, the chain follows and therefore, the chain may be pulled completely through the open end of the body and up through the enlarged ring receiving opening 39 formed in the top wall of the body. In this manner, the body need not be moved at all relative to the channel. Then, by removing the pin 52, the chain can be replaced and then inserted back through the opening 39 and the open end 24 of the body and the shaft 35 replaced, the pawl replaced and the unit again ready for operation.

Having fully described an operative embodiment of this invention, I now claim:

1. A vehicle holddown comprising:
    a hollow, box-like body having a bottom wall and a top wall spaced therefrom, and an open front end for access to the space between the walls;
    a vertically axised shaft arranged within the body and having its lower end rotatably journalled within an opening formed in the bottom wall, whereby an end of a flexible holddown element may be extended into the body through the open end thereof and engaged with the shaft for winding around the shaft;
    a co-axial, annular ring, of considerably larger diameter than the shaft, formed on the upper end of the shaft, with said ring being rotatably journalled within a correspondingly sized opening formed in the body top wall;
    a co-axially arranged gear-like toothed ratchet wheel formed upon the upper surface of the ring, with the wheel being of a smaller diameter than the ring so that the lower portion of the wheel is surrounded by an annular border formed by the ring;
    a horizontally swingable pawl arranged upon and pivotally connected to the top wall of the body, and having a ratchet engaging pawl end portion engaged with at least one tooth of said ratchet wheel and simultaneously overlapping the portion of said ring forming border adjacent to and extending radially outward of said engaged tooth for thereby simultaneously holding the wheel against rotation in one direction and holding the shaft against upward axial movement for locking the shaft within the body.

2. A construction as defined in claim 1, and a manually removable pivot means removably connecting said pawl to said body top wall, so that the pawl may be removed and thereby the ratchet wheel, ring and shaft unit may be manually upwardly removed from the body.

3. A construction as defined in claim 2, and wherein the body opened forward end and also the top wall opening, within which the ring is journalled, are both of sufficient size to pass through the flexible holddown element, including any hook-like vehicle attaching means secured on the opposite end of said element, for thereby permitting complete removal of the element along with the shaft upwardly through the top wall opening without moving the body.

4. A construction as defined in claim 1, and said body being shaped to endwise slidably fit within an upwardly opening, elongated, fixed support channel; and said body having side wall portions arranged to engage with the walls defining said channel for holding the body in predetermined fixed positions relative to said channel.

5. A vehicle holddown comprising:
a hollow, box-like body having a bottom wall and a top wall spaced therefrom, and having an open forward end for access to the space between the walls;

a vertically axised shaft arranged within the body and having its upper and lower ends rotatably journalled within openings formed in the top and bottom walls respectively, whereby an end of a flexible holddown element may be extended into the body through the open end thereof and engaged with the shaft for winding around the shaft;

a co-axially arranged gear-like toothed ratchet wheel formed upon the upper end of the shaft and located above the top wall surface;

a horizontally swingable pawl arranged upon and pivotally connected to the top wall of the body, and having a ratchet engaging pawl end portion engaged with at least one tooth of said ratchet wheel to hold the wheel against rotation in one direction;

and an integral raised portion formed upon the top wall surface between the wheel and the body forward end and being of about the height of the wheel to shield the wheel;

and said raised portion being formed as a transversely extending ridge portion arranged at the body forward end, and of about the height of the wheel, and a lower raised section located between the ridge portion and the wheel and partially surrounding the wheel.

6. A construction as defined in claim 5, and said body being formed of a one-piece casting.

7. A vehicle holddown comprising:
a hollow box-like body having a bottom wall and a top wall spaced therefrom, and having an open forward end for access to the space between the walls;

a vertically axised shaft arranged within the body and having its upper and lower ends rotatably journalled within openings formed in the top and bottom walls respectively, whereby an end of a flexible holddown element may be extended into the body through the open end thereof and engaged with the shaft for winding around the shaft;

a co-axially arranged gear-like toothed ratchet wheel formed upon the upper end of the shaft and located above the top wall surface;

a horizontally swingable pawl arranged upon and pivotally connected to the top wall of the body, and having a ratchet engaging pawl end portion engaged with at least one tooth of said ratchet wheel to hold the wheel against rotation in one direction;

and an integral raised portion formed upon the top wall surface between the wheel and the body forward end and being of about the height of the wheel to shield the wheel;

and a co-axial, annular ring, of considerably larger diameter than the shaft, formed on the upper end of the shaft beneath the wheel, with said ring being rotatably journalled within the body top wall opening;

said ring being of a larger diameter than said wheel to form a border around the lower end of the wheel;

and said pawl overlapping the portion of said border adjacent to and extending radially outward of said engaged tooth for thereby holding the shaft against upward axial movement for locking the shaft within the body.

* * * * *